June 24, 1958     V. WOUK     2,840,766

PROTECTIVE SPARK GAP

Filed Jan. 15, 1957

VICTOR WOUK
INVENTOR

BY Ralph E. Bitner

ATTORNEY

United States Patent Office 2,840,766
Patented June 24, 1958

2,840,766

PROTECTIVE SPARK GAP

Victor Wouk, New York, N. Y., assignor to Sorensen & Company, Inc., Stamford, Conn., a corporation Application January 15, 1957, Serial No. 634,201

5 Claims. (Cl. 317—16)

This invention relates to a protective spark gap arrangement which fulfills the function of a circuit breaker or thyratron but uses no vacuum tubes, heated cathodes, nor moving parts. It has particular reference to a protective circuit arrangement which can be used with high voltage power supplies which do not supply much current. The device may also be used in connection with high current systems.

In all ordinary systems of distribution of electrical energy for lighting or power means, sufficient current is transmitted so that an increase in load above a predetermined amount may be sensed by the increase in current through the load and protective devices switched into or out of the circuit by electromagnetic means for the protection desired.

In high voltage circuits where very little current is supplied, the current is not sufficient to operate any electromagnetic devices directly and therefore other means must be devised to protect the high voltage power supply and the load against short-circuit or flash-over. Such protective devices are of increasing importance when the high voltage power supply is used for paint spraying equipment. In such applications an explosion is often started by a spark from the high voltage generator causing a short-circuit to ground and exploding the vaporized paint when mixed with air. The present invention practically eliminates this hazard by reducing the strength of the short-circuiting spark to which an extent that it cannot start an explosion.

The invention does not use electromagnetic means but instead comprises three spark gaps between three spheres and operates to shunt the load circuit whenever the load circuit is short-circuited.

One of the objects of this invention is to provide an improved protective circuit which avoids one or more of the disadvantages and limitations of prior art arrangements.

Another object of the invention is to short-circuit a high voltage power supply through a parallel connected spark gap whenever the load resistance is reduced by a predetermined amount.

Another object of the invention is to provide a protective circuit which is not dependent upon electromagnetic means.

Another object of the invention is to provide a protective device which will operate within a few microseconds to protect the power supply and the load from high current drains, particularly with respect to explosions and personnel shock hazards.

Another object of the invention is to reduce the cost of protective systems.

The invention comprises a spark gap which includes three spherical electrodes positioned in such a manner that no spark will be generated during the normal operation of the power supply. Two electrodes are connected respectively to the positive and negative supply lines while the third is connected to a voltage divider which applies a voltage to the electrode which is a fraction of the voltage between the other electrodes. A capacitor is connected between the third electrode and the positive side of the line for storing a charge which is utilized when a short-circuit occurs.

For a better understanding of the present invention, together with other and further objects thereof, reference is made to the following description taken in connection with the accompanying drawings.

Figure 1:
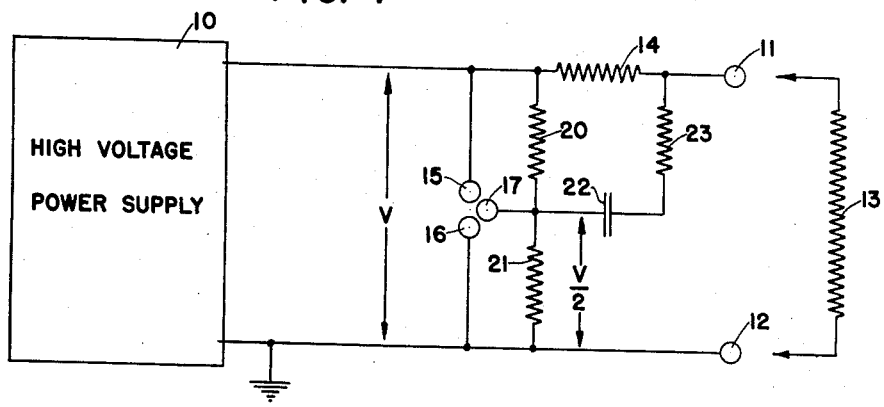
Fig. 1 is a schematic diagram of connections showing the power supply in block form.

Referring now to Fig. 1, a high voltage power supply 10 is connected as shown to a pair of output terminals 11, 12; these terminals being arranged for the attachment of a load 13 which in this case is a pure resistance. However, it is to be understood that the load may be the space between a spray nozzle and an article on which paint is to be deposited. In other applications the high voltage may be applied to an X-ray or a dust precipitator. The description which follows is in connection with a specific example and is not to be interpreted in a limiting sense.

The protective circuit includes a series resistor 14 in series between the positive terminal 11 and the high voltage power supply 10. It also includes a spark gap between two spherical electrodes 15 and 16, each of these electrodes being connected to one side of the power supply as indicated. A third electrode 17 is positioned intermediate the other two and is connected to a voltage divider comprising resistors 20 and 21. These two resistors are assumed to be of equal value (for this example) thereby giving electrode 17 a potential which is half the voltage of the power supply. The circuit also includes a capacitor 22 connected in series with a resistor 23, this circuit being connected between electrode 17 and output terminal 11.

The operation of this circuit is as follows: During the normal operation of the circuit the spacing between electrodes 15 and 17, and 17 and 16 is such that they will break down at three-quarters of the output voltage. Electrodes 15 and 16 are spaced so that they will break down at a voltage which is one and one-half times the output voltage. During the normal operation of the power supply no sparking will occur and capacitor 22 is charged to half the voltage of the power supply.

Now let it be assumed that a short or flash-over occurs between terminals 11 and 12. This condition reduces the voltage of terminal 11 to zero. As soon as the potential of terminal 11 is reduced to zero the right side of capacitor 22 is also reduced to zero. Since the voltage across capacitor 22 cannot change instantaneously, and since it has been equal to half the voltage of the power supply the potential of the left side of the capacitor and of electrode 17 will be changed from a positive voltage to a negative voltage. At this point the voltage difference between electrodes 15 and 17 will be approximately one and a half times the output voltage, and this obviously causes a spark between electrodes 15 and 17, thereby ionizing the air in the vicinity of the gap and giving electrode 17 a potential equivalent to the full voltage of the power supply. Since electrodes 16 and 17 are spaced so as to withstand a voltage of only three-quarters of the output voltage, this gap will break down and, because of the ionization present, a spark will pass from electrode 15 to electrode 16, thereby shorting the high voltage supply and reducing the energy at the output terminals to approximately zero. The maintainance of the spark between electrodes 15 and 16 will depend entirely upon the internal series resistance in the power supply 10 and this spark may trip another circuit breaker, go out, or be maintained at a small value of current.

Figure 2:
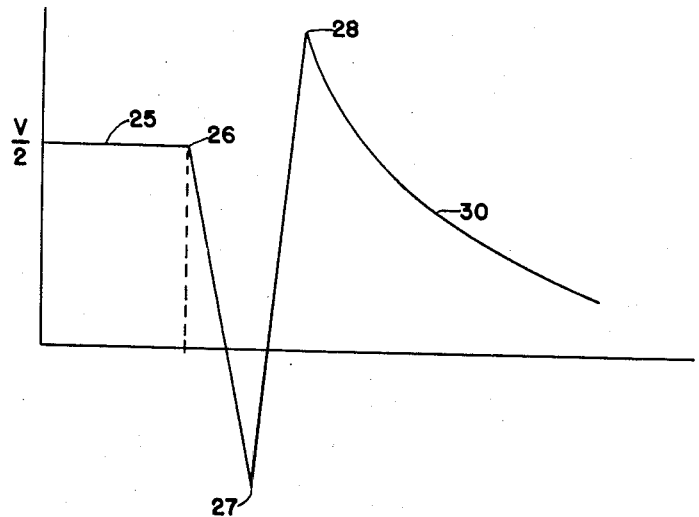
Fig. 2 is a graph showing the approximate voltage-time characteristic of the trigger electrode voltage whenever a short occurs.

The above sequence of operations may be better understood by reference to the graph shown in Fig. 2, plotted between voltage values and time. During the normal operation, the voltage of electrode 17 is indicated by line 25 which is equal to one-half the terminal voltage. When a flash-over occurs between output terminals 11 and 12 the voltage of electrode 17 drops abruptly to a negative value as indicated by the line between points 26 and 27. At point 27 an arc is established between electrodes 15 and 17 causing an abrupt rise of voltage of electrode 17 as indicated by the line 27 to 28. At point 28 an arc is established between electrodes 17 and 16 and the voltage of electrodes 15 and 17 drops in a manner indicated by curve 30 which is dependent upon the internal characteristics of the power supply 10.

The entire operation of this circuit from point 26 to point 28 occurs in a few microseconds so that the amount of power dissipated in the load is quite small.

The following circuit constants may be used in the device shown in Fig. 1 and are illustrative of a specific application of the invention:

| | |
|---|---|
| Resistors 20 and 21 | $10^9$ ohms. |
| Resistor 23 | $10^4$ ohms. |
| Resistor 14 | $10^3$ ohms. |
| Voltage V | 100,000 volts. |
| Capacitor 22 | 500 micromicrofarads. |

From the above description it will be evident that the invention provides a nonmechanical protective circuit which will protect a high voltage power supply from flashover at the load terminals and will further protect any load arrangement which uses such a high voltage supply.

The foregoing disclosure and drawings are merely illustrative of the principles of this invention and are not to be interpreted in a limiting sense. The only limitations are to be determined from the scope of the appended claims.

I claim:

1. A protective circuit for a high voltage direct current power supply comprising, three electrodes arranged so as to provide three air gaps, one of said electrodes connected to a positive supply conductor, a second of said electrodes connected to a negative supply conductor, and a third of said electrodes connected to the mid-point of a voltage divider whose ends are connected respectively to said positive and negative supply conductors, and a capacitor connected between said third electrode and the positive supply conductor in series with a resistor.

2. A protective circuit for a high voltage direct current power supply comprising, three spherical electrodes arranged so as to provide three air gaps, one of said electrodes connected to a positive supply conductor, a second of said electrodes connected to a negative supply conductor, and a third of said electrodes connected to the mid-point of a high resistance voltage divider whose ends are connected respectively to said positive and negative supply conductors, and a capacitor connected between said third electrode and the positive supply conductor in series with a resistor.

3. A protective circuit for a high voltage direct current power supply comprising, three electrodes arranged so as to provide three air gaps, one of said electrodes connected to a positive supply conductor, a second of said electrodes connected to a negative supply conductor, and a third of said electrodes connected to the mid-point of a voltage divider whose ends are connected respectively to the positive and negative supply conductors, said first and second electrodes spaced so as to pass current therebetween only when the voltage between them is greater than three-halves of the normal supply voltage, and a capacitor connected between said third electrode and the positive supply conductor in series with a resistor.

4. A protective circuit for a high voltage direct current power supply comprising, positive and negative supply conductors connected to said power supply, two terminals for connection to a load, one of said terminals connected to said negative conductor, the second of said terminals connected to the positive conductor in series with a resistor, a first electrode connected to said positive supply conductor, a second electrode connected to said negative supply conductor, a third electrode connected to the mid-point of a voltage divider whose ends are connected respectively to the positive and negative supply conductors, and a capacitor connected between said third electrode and the positive supply conductor in series with a resistor.

5. A protective circuit for a high voltage direct current power supply comprising, positive and negative supply conductors connected to said power supply, two terminals for connection to a load, one of said terminals connected to said negative conductor, the second of said terminals connected to the positive conductor in series with a resistor, a first electrode connected to said positive supply conductor, a second electrode connected to said negative supply conductor, a third electrode connected to the mid-point of a voltage divider whose ends are connectede respectively to the positive and negative supply conductors, said electrodes spaced so as to form three air gaps, the gap between the first and second electrode adjusted to pass current therebetween when the voltage is greater than three-halves of the normal supply voltage, the gaps between the third electrode and the first and second electrodes adjusted to pass current therebetween when the applied voltage is three-quarters of the normal supply voltage, and a capacitor connected between said third electrode and the positive supply conductor in series with a resistor.

References Cited in the file of this patent

UNITED STATES PATENTS

| 1,473,881 | Scott | Nov. 13, 1923 |
| 2,474,711 | Yonkers | June 28, 1949 |

FOREIGN PATENTS

| 414,385 | Germany | June 2, 1925 |